Aug. 16, 1966     R. M. DAVIS     3,266,464

GROOMING TETHER DEVICE

Filed June 1, 1964

INVENTOR.
RONALD M. DAVIS
BY
Boniard I. Brown
ATTORNEY

United States Patent Office 3,266,464
Patented August 16, 1966

3,266,464
GROOMING TETHER DEVICE
Ronald M. Davis, Covina, Calif.
(3907 Shady Hill Drive, Dallas, Tex.)
Filed June 1, 1964, Ser. No. 371,456
5 Claims. (Cl. 119—103)

The present invention relates generally to a tethering device for the grooming of animals, such as dogs; more particularly, the invention relates to a grooming tether device wherein a tether is adjustable in height relative to a grooming arm to accommodate an animal to be groomed.

In the grooming of animals such as dogs, and particularly in the grooming and preparation of animals for occasions such as shows, the animals have ordinarily been groomed atop a grooming table or other surface, such as a shipping crate. Some type of upright structure or arm has been provided for supporting a tether loop or noose for holding the animal. The tether has conventionally been of fixed length and the upright member or grooming arm has been vertically adjustable for the positioning of the tether.

The present invention provides a new and improved grooming tether device which provides a tether of adjustable length, this length being adjustable by governing the position of the tether relative to a grooming arm which may be mounted on a base or affixed to a table, crate or the like. The grooming tether device includes a grooming arm, means for mounting and positioning the grooming arm above a base on which the animal is positioned, a tether depending from the grooming arm and including a loop portion for engaging the animal's neck, adjustment or holding means on the tether above the grooming arm, and second adjustment or holding means on the tether below the grooming arm. The first adjustment or holding means is adapted to engage the strands of the tether to maintain a position on the tether and to cooperate with a laterally extending portion of the grooming arm to secure the tether against movement, thereby establishing a vertical position of the tether to accommodate the animal. The second adjustment or holding means is positionable along the tether below the laterally extending grooming arm portion and engages the strands to maintain its position thereon. The second adjustment or holding means is positioned to define a loop size to accommodate the animal.

It is therefore an object of the present invention to provide a new and improved grooming tether device for animals.

An object of the invention is the provision of a grooming tether device wherein a tether is adjustable in length by adjustment of its position relative to a supporting grooming arm to accommodate an animal to be groomed.

An object of the invention is to provide an improved, simplified and relatively inexpensive tether device.

An object of this invention is to provide a grooming tether device according to the foregoing objects wherein adjustments to accommodate the size of an animal may be made very conveniently and effectively.

It is an object of the invention to provide a grooming tether device according to the foregoing objects which eliminates the necessity for mechanical devices to adjust for the height and size of the animal.

An object of the invention is the provision of a grooming tethering device wherein adjustment means on a tether provide for the adjusting of the length of the tether suspended from a grooming arm to accommodate the height of an animal, and for adjustment in the size of a loop of the tether.

Other objects, features and advantages of the present invention will become apparent to those versed in the art from a consideration of the following description, the appended claims and the accompanying drawings, wherein:

Figure 1:
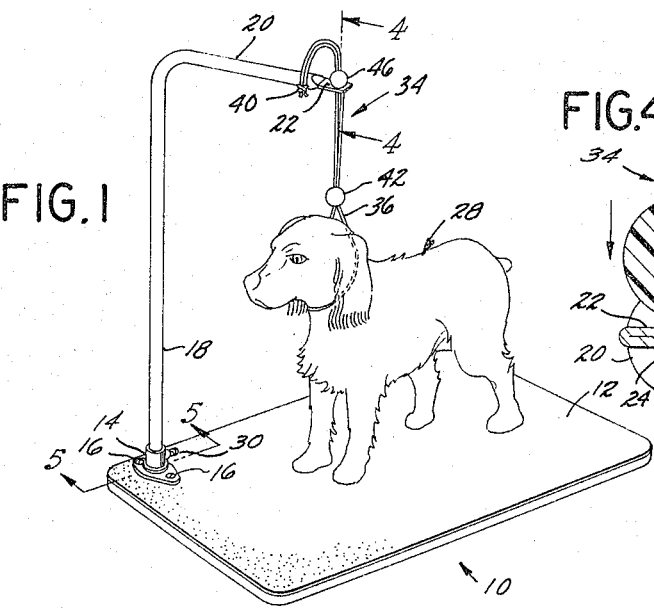
FIGURE 1 is a perspective view of a preferred embodiment of the grooming tether device of the invention, showing an animal positioned and tethered to be groomed.
Figure 2:
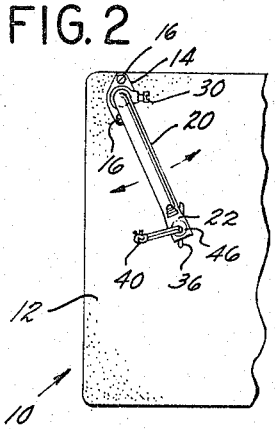
FIGURE 2 is a partial top view of the tether device of FIGURE 1.
Figure 5:
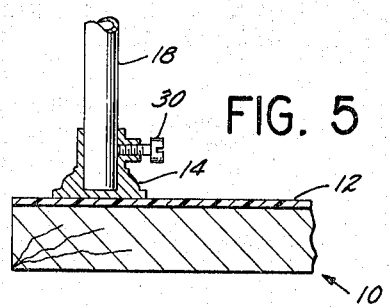
FIGURE 5 is an enlarged sectional view taken at line 5—5 of FIGURE 1.

Referring to the drawing, FIGURE 1 illustrates a preferred embodiment of the tethering device of the invention, wherein a platform or base 10 has an upper surface covering 12 of plastic, linoleum or other appropriate material. A socket bracket 14 is secured by screws 16 adjacent to a corner of the base 10. Secured in the socket of the socket bracket is an upright portion 18 of a grooming arm which has a horizontal or laterally extending arm portion 20. The grooming arm may preferably be of tubular construction and has a flattened outer end portion 22 wherein are defined two holes or openings 24, 26.

A dog 28 or other animal to be groomed is positioned on the platform 10, as shown. The laterally extending arm portion 20 of the grooming arm extends over the animal, and to facilitate the positioning of arm portion 20 the upright portion 18 may preferably be adjustable angularly by loosening and re-tightening a set screw 30 mounted in socket bracket 14.

A tether 34, preferably fabricated of nylon or other appropriate material, provides a loop 36 to be disposed about the neck of the animal. The tether comprises two strands 38 which extend through respective openings 24, 26 in the flattened end portion of the laterally extending portion 20 of the grooming arm. The ends of the strands above the grooming arm are secured together at 40, as by knotting or other appropriate means.

An adjustment or holding member in the form of a ball 42 having a diametrical opening 44 is positioned on the tether strands 38 below grooming arm portion 20. The tether strands extend through the opening 44 and the ball 42 frictionally engages the strands. The ball is therefore adjustable in position along the strands and is adapted to engage them to maintain the position of the ball and to secure the strands together. By adjusting the position of the ball along the strands, the size of the loop 36 is conveniently adjustable to accommodate the size of a particular animal.

Another adjustment or holding device in the form of a similar ball 46 having a diametrical opening 48 therethrough, is positioned on the tether strands 38 above the laterally extending grooming arm portion 20. The ball 46 is positionally adjustable along the strands 38, and the ball engages the strands to maintain the position of the ball on the strands.

Figure 4:
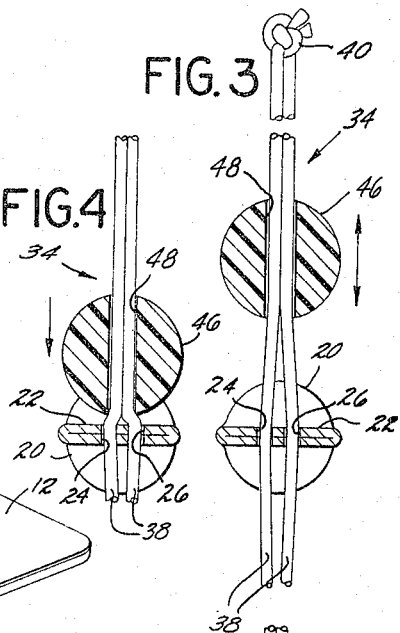
FIGURE 4 is an enlarged partial detail view, similar to a portion of FIGURE 3, showing an adjustment member in operative relation with a portion of the grooming arm.
Figure 3:
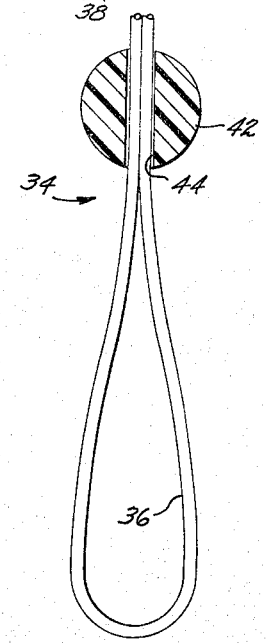
FIGURE 3 is an enlarged detail view of the tether of the device of FIGURE 1, showing the relationship of the tether with adjustment members and a grooming arm of the device of FIGURE 1.

FIGURE 4 illustrates the cooperation of the ball 48, flattened grooming arm porion 22, openings 24, 26, and tether strands 38 in securing the tether relative to grooming arm portion 20, and thereby establishing the length of the tether which depends below the laterally extending grooming arm portion 20. With the selected length of the tether disposed below grooming arm portion 20 in accordance with the height of the dog or animal to be groomed, the ball 48 is positioned as indicated in FIGURE 4. From the illustrated geometry of the parts, it will be understood that downward movement of the tether strands relative to grooming arm portion 20 is prevented by engagement of the ball 48 with portions of the tether strands 38 which are bent or spread apart to extend through the spaced openings 24, 26. It will be readily appreciated that the length or extent of the tether which depends or is suspended below grooming arm portion 20 is very conveniently and readily adjustable to accommodate a particular animal.

Figure 6:
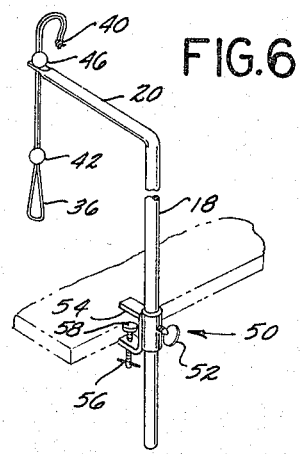
FIGURE 6 is a perspective view of a modified form of grooming tether device according to the invention, wherein bracket means are utilized for mounting the device on an edge portion of a base.

From the foregoing, the operation and utilization of the grooming tether device of the invention will be understood. With the device assembled, as shown in FIGURE 1, the upright portion 18 of the grooming arm is secured in the socket 14 by means of set screw 30. The animal is positioned on the base or platform 12. The ball 42 is adjusted in position along the tether strands 38 below grooming arm portion 20, in the manner hereinbefore described to provide a loop of appropriate size about the neck of the animal. With the loop positioned about the animal's neck, the length of the tether below the grooming arm 20 is selected and is established, by pulling on the tether above grooming arm portion 20, and by positioning the ball 48 in the manner hereinbefore described in relation to FIGURE 4. The animal is thus closely secured and tethered in a very quick and convenient manner. No other apparatus, mechanical manipulations, or adjustments are necessary. The need for a grooming table or shipping crate is eliminated. FIGURE 6 illustrates a modified form of the grooming tether device of the invention, which differs from the embodiment hereinbefore described in that the upright portion 18 of the grooming arm is supported in a different type of bracket 50 which has a wing nut 52 for securing upright portion 18 in such manner that the height of the grooming arm may be selected or adjusted. The bracket 50 includes a U-shaped yoke portion 54 and an adjusting or setting screw 56 extending through an arm of yoke portion 54, the setting screw having a slightly pivotable flat member 58 at its end. This bracket arrangement provides means for the convenient and rapid securement of the tether device on the edge portion of a table, platform, or other appropriate base.

It will be understood that equivalent types of adjustment or holding members or devices may be utilized with the invention, in addition to the adjustment balls 42 and 48 herein shown and described.

From the foregoing description, those versed in the art will appreciate that the present invention achieves the objects and realizes the advantages hereinbefore mentioned, in addition to additional advantages which will be understood from the description.

Although specific embodiments of the present invention have been illustrated and described herein, it will be understood that the same are merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventor claims:
1. A grooming tether device for an animal, comprising grooming arm means having an upright portion and a laterally extending arm portion, said laterally extending arm portion having two openings therein, tether means comprising a flexible cord having respective strands thereof extending through said respective openings to define a loop below said laterally extending arm portion, first holding means on said tether strands above said laterally extending grooming arm portion and positionally adjustable along the strands, said first holding means being adapted to engage the strands to maintain its position thereon and to cooperate with the laterally extending arm portion to secure the tether strands against movement relative to said arm portion, thereby establishing the vertical position of the tether means to accommodate the height of the animal, and second holding means positionable along said tether strands below the laterally extending arm portion and adjustable in position thereon, said second holding means being adapted to engage the strands to maintain its position thereon and to secure the strands together to define a loop size to accommodate the animal to be groomed.

2. A grooming tether device according to claim 1, wherein each of the first and second holding means comprises a holding member having an opening through which the tether strands extend.

3. A grooming tether device according to claim 1, wherein said laterally extending arm portion is of tubular construction and has a flattened outer end portion defining said two openings to receive the respective tether strands.

4. A grooming tether device according to claim 1, and further including flat platform means for accommodating the animal, and means mounting the grooming arm to extend upwardly from the platform.

5. A grooming tether device according to claim 1, and further including bracket means, and means for securing the bracket to an edge portion of a platform, said bracket means being adapted for adjustably supporting the grooming arm.

References Cited by the Examiner
UNITED STATES PATENTS

| | | | |
|---|---|---|---|
| 215,730 | 5/1879 | Fox et al. | 119—117 |
| 754,241 | 3/1904 | Roll | 224—28 |
| 1,401,393 | 12/1921 | Cross | 119—103 |
| 1,509,781 | 9/1924 | Roth | 119—109 X |
| 2,902,976 | 9/1959 | Wilson | 119—19 |
| 2,981,230 | 4/1961 | Putnam | 119—117 |
| 3,120,836 | 2/1964 | Brauning | 119—103 |

SAMUEL KOREN, *Primary Examiner.*
ALDRICH F. MEDBERY, *Examiner.*